Oct. 16, 1928.
C. A. GARVEY
1,687,647
INSCRIBING INSTRUMENT
Filed Dec. 2, 1926
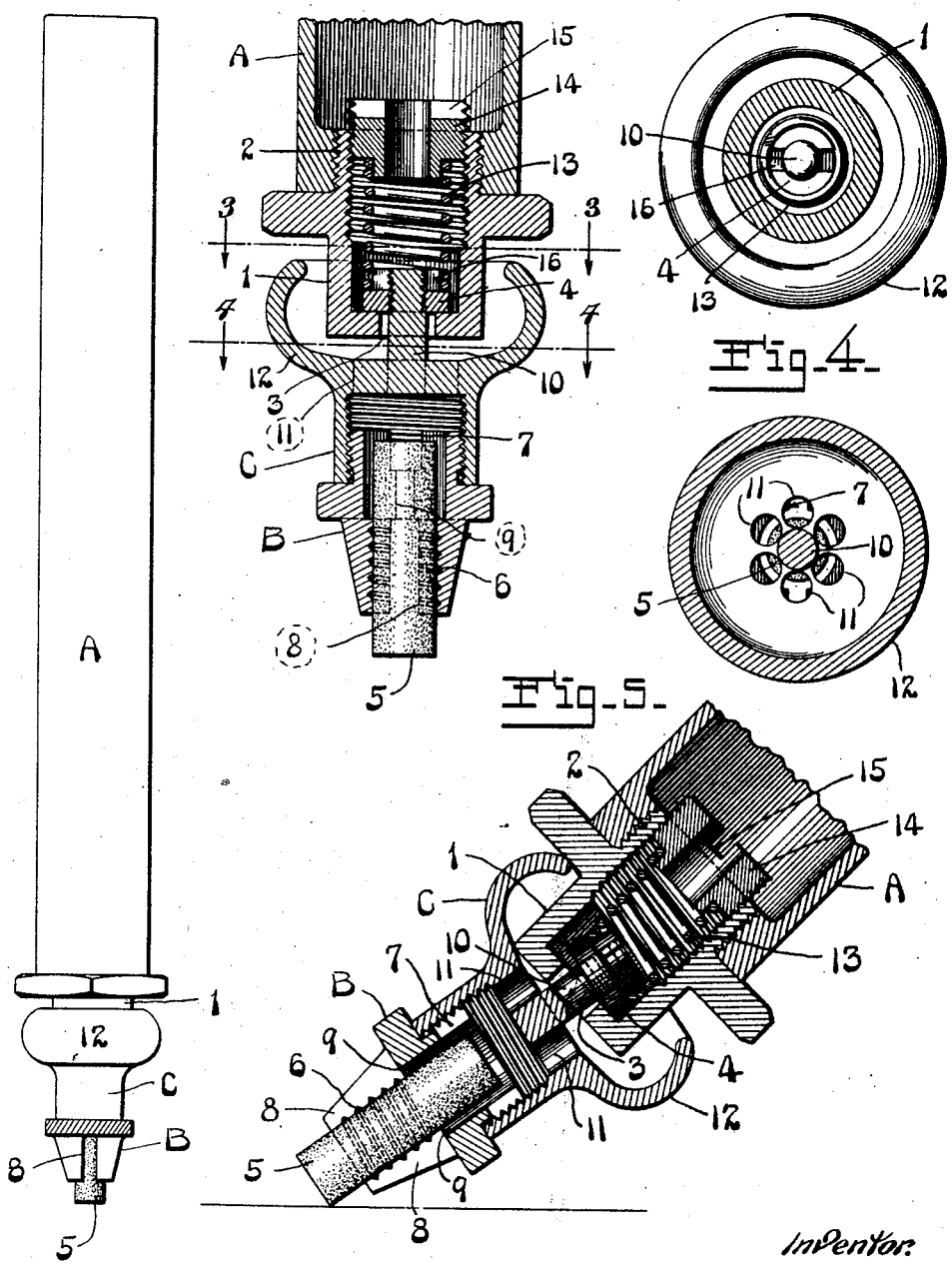

Patented Oct. 16, 1928.

1,687,647

UNITED STATES PATENT OFFICE.

CHRISTOPHER A. GARVEY, OF CLAYTON, MISSOURI; JENNIE SINCLAIR GARVEY EXECUTRIX OF SAID C. A. GARVEY, DECEASED.

INSCRIBING INSTRUMENT.

Application filed December 2, 1926. Serial No. 152,142.

This invention relates to instruments for transferring fluid from a reservoir to some other object, and to illustrate one form of the invention I have shown an inscribing instrument having a tip which receives fluid discharged from the reservoir. It is to be understood that any desired form of tip may be used in the invention hereafter described.

One of the objects is to produce an instrument of this kind wherein there is a continuous flow of fluid to the tip when the device is in service. Another object is to automatically vary the rate of flow in response to variations in the pressure on the tip. A further object is to obtain both of these results while the instrument is held in the natural writing position, at an angle to a vertical line.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

To illustrate one form of the invention 1 will describe a device comprising a reservoir for the inscribing fluid, and a tiltable inscribing tip whereby a valve is actuated to regulate the delivery of fluid to the inscribing tip. When the device is in service it may be held at any angle desired by the user, and while writing in the natural and most convenient manner, there will be a substantially continuous flow of fluid to the inscribing tip. The tip is yieldingly secured to the reservoir and the valve is operated in response to the tilting motion of the tip, so as to deliver a large quantity of fluid when the tip is subjected to a high pressure, and less fluid when under a low pressure. This enables the user to follow his natural inclination by holding the instrument at the most convenient angle and pressing lightly to make light lines, and using more force for heavy lines. By varying the flow in accordance with the pressure, the desired amount of fluid is delivered, without flooding the tip, and I will hereafter show how the device can be adjusted to suit different users, and also to obtain the rate of flow most desirable for the conditions under which it is used.

Fig. 1 is a side elevation of an instrument embodying the features of this invention.

Fig. 2 is an enlarged vertical section showing the elements at the lower portion of the instrument.

Fig. 3 is a section on the line 3—3 in Fig. 2.

Fig. 4 is a section on the line 4—4 in Fig. 2.

Fig. 5 is a view similar to Fig. 2, suggesting the manner in which the inscribing member and its holder are tilted to open a valve when the device is in use.

A designates an elongated reservoir having a valve housing 1 at its lower end. This housing has an extension 2 at the top screwed into the reservoir and a discharge opening 3 at its lower end. The flow of fluid through this opening is regulated by means including a valve 4, as will be hereafter described.

The inscribing tip shown to illustrate the invention is a flexible member 5 made of absorbent material and adjustably secured in a rigid holder comprising a lower member B and an upper member C. The lower member has internal threads at 6 which enter into the absorbent tip to permit longitudinal adjustment thereof. To allow the ink, or other fluid, to flow downwardly on the surface of the tip the lower member B has a transverse notch 7 at the top, slots 8 at the bottom, and grooves 9 allowing the ink to pass through said member B.

The upper member C of the tip holder is threaded to receive the threaded upper end of the lower member B, as clearly shown in Fig. 2. This upper member C is provided with a rigid stem 10 extending through the discharge opening 3 and screwed into the valve 4. The ink, or other fluid, passing through this opening 3, flows downwardly through holes 11 formed in the member C, and thence to the tip 5.

To prevent leakage between the tip holder and the reservoir, the member C of said holder may be provided with an extension 12, approximately in the form of a cup, or bowl, surrounding the lower portion of the valve housing 1 which forms the bottom of the reservoir. This extension 12 is separated from the valve housing to provide for the tilting motion, and it is preferably curved inwardly at its upper margin, as shown in the drawings, to prevent leakage when the device is tilted.

The valve 4 has a reduced upper portion surrounded by the lower end of a spring 13, and the upper end of this spring contacts with a hollow screw 14 having a projection which extends into the spring. The valve housing 1 has internal threads to receive the screw 14, and the latter is notched at 15 to receive a tool whereby it can be adjusted to vary the pressure of the spring. The valve 4 is likewise notched at 16 to receive a screw driver.

The valve seat at the bottom of the housing 1 is flat, and the valve 4 has a flat face adapted to contact with the seat. The flat valve seat lies at right angle to the longitudinal center line of the reservoir, and the flat bottom face of the valve lies at right angle to the center line of the tip 5 and its holder, so the spring acting on the valve tends to retain the tip 5 and its rigid holder B, C in alinement with the reservoir.

When the device is in service, the reservoir is held at the angle most convenient for the user, and the pressure transmitted from the reservoir tilts the tip 5 relative to the reservoir. The valve is universally tiltable, so it is not necessary to hold the device in any particular position. The rigid tip holder, the stem 10 and the valve 4 are tilted with the tip, as suggested in Fig. 5 which is an exaggerated view illustrating an extreme condition. The valve is thus held in its open position to provide a continuous flow of fluid from the reservoir to the tip throughout the period in which the device is used. The rate of flow will depend upon the extent to which the valve 4 is tilted, and this in turn depends upon the pressure applied to the tip. The operator will naturally use more force for heavy lines than for light lines, and the flow of ink will automatically conform to this natural inclination.

By adjusting the screw 14 to vary the pressure of the spring 13, the flow can be regulated for different operators, or for different kinds of work. This spring 13 also serves as means for closing the valve and restoring the other tiltable elements when the tip is relieved of pressure.

I claim:

1. An inscribing instrument comprising a reservoir for the inscribing fluid, a valve to control the discharge of fluid from said reservoir, a flexible inscribing tip, a rigid holder in which said tip is mounted, said holder being rigidly secured to said valve, said tip, holder and valve being tiltable in different directions relative to said reservoir so as to regulate the delivery of fluid to the tip, and a spring whereby the tiltable parts are restored.

2. An inscribing instrument comprising a reservoir for the inscribing fluid, a valve housing secured to the lower end of said reservoir, a valve located in said housing to control the discharge of said fluid, a flexible inscribing tip, a rigid holder in which said tip is mounted, a rigid stem extending from said holder and projecting into said valve housing, said valve being screwed onto said stem, said tip, holder, stem and valve being tiltable relative to said valve housing, a spring whereby the tiltable parts are restored, the valve being yieldingly held in its closed position by said spring, and means for varying the pressure of said spring.

3. In a device of the character described, a reservoir having an outlet, a holder carried by the reservoir below said outlet, a tip mounted in said holder, a valve to control the flow of fluid from said outlet to said holder, said holder being yieldably mounted relative to the reservoir and means for preventing leakage between said holder and reservoir, said means including a cup extending from and movable with said holder.

4. In a device of the character described, a reservoir having an outlet, a holder carried by the reservoir below said outlet, a tip mounted in said holder, a valve to control the flow of fluid from said outlet to said holder, said holder being yieldably mounted relative to the reservoir, and means for preventing leakage between said holder and reservoir, said means including a member extending from the upper end of said holder and surrounding the lower end of said reservoir.

5. An inscribing instrument comprising a reservoir for the inscribing fluid, a valve to control the discharge of fluid from said reservoir, a flexible inscribing tip, a rigid holder in which said tip is mounted, said holder being rigidly secured to said valve, said tip, holder and valve being tiltable relative to said reservoir so as to regulate the delivery of fluid to the tip, a spring whereby the tiltable parts are restored, and means for preventing leakage between said holder and reservoir, said means comprising a member approximately in the form of a cup extending from the upper end of said holder and surrounding the lower end of said reservoir, said member being separated from the reservoir to provide for the tilting motion.

6. An inscribing instrument comprising a reservoir for the inscribing fluid, a valve tiltable in different directions controlling the discharge of fluid from said reservoir, and an inscribing member rigidly secured to said valve.

7. An inscribing instrument comprising a reservoir for the inscribing fluid, a valve-housing secured to and forming the lower end of said reservoir, a valve located in said housing to control the discharge of said fluid, a flexible inscribing tip, a rigid holder in which said tip is mounted, and a rigid stem extending from said holder and projecting into said valve housing, said valve being secured onto said stem, said tip holder, stem and valve being tiltable relative to said valve-housing so as to regulate the delivery of fluid to the tip.

In testimony that I claim the foregoing I hereunto affix my signature.

CHRISTOPHER A. GARVEY.